March 21, 1961 R. W. GODDARD 2,976,378
ACCELERATION RESPONSIVE DEVICES
Filed June 3, 1958 2 Sheets-Sheet 1

INVENTOR.
ROBERT W. GODDARD
BY
*George C. Sullivan*
Agent

INVENTOR.
ROBERT W. GODDARD
BY
*George Sullivan*
Agent

United States Patent Office 2,976,378
Patented Mar. 21, 1961

2,976,378

ACCELERATION RESPONSIVE DEVICES

Robert W. Goddard, San Jose, Calif., assignor to Lockheed Aircraft Corporation, Burbank, Calif.

Filed June 3, 1958, Ser. No. 739,542

6 Claims. (Cl. 200—61.45)

The present invention relates to acceleration responsive devices and more particularly to improved inertia type acceleration switches.

The inertia of a mass is the characteristic most frequently used to operate acceleration responsive devices. An acceleration switch is an acceleration responsive device which is capable of effectively opening and closing electrical circuits in response to the forces of acceleration acting on the inertia of the mass of a switch operator.

The response of the switch operator to acceleration is the object of certain refinements in order to open or close a circuit only after an accurately predetermined acceleration level has been reached and which is of a minimum time duration. Often the acceleration switch is also selective as to the direction and plane of the acceleration relative to the orientation of the switch on the body being accelerated.

In many instances, the reliability and accuracy of the response of acceleration switches can be substantially improved if no mechanical linkage between the switch operating mechanism and the electrical circuit elements, e.g. movable contact members, is necessary. Further, by avoiding this linkage, the switch operator mass can be fluid damped by even viscous fluids such as silicone without fouling the electrical circuit elements. In many instances, electrical contacts placed in the damping fluid in order to mechanically engage the switch operator therein are unreliable because the contacts are difficult to close through the fluid. Also, electrical contacts in the damping fluid require that the fluid be kept clean.

The foregoing difficulties have been overcome in the present invention by providing an accelerative responsive device producing a magnetic field varying in intensity with acceleration and disposing circuit elements actuable in response to a predetermined magnetic field intensity in the varying magnetic field.

In accordance with a preferred embodiment, a magnetic acceleration switch has an elongated switch housing including side and end walls. The switch operating mechanism includes a magnetic switch operator including a reciprocating magnet providing an inertia mass. The magnet is enclosed in a sealed tube guiding the magnet for uni-directional sensitivity. The magnet is damped by a viscous damping fluid in the sealed tube. The magnet is biased for reciprocating motion in response to subsequent accelerations by helical spring placed longitudinally in the sealed tube. An open ended guide tube is supported centrally in and along the length of the elongated housing to guide the sealed tube enclosure containing the magnet. Movable contact members responsive to the magnetic field of the magnet are enclosed in a sealed envelope or capsule supported adjacent the open ended guide tube whereby predetermined accelerations operating on the magnet actuate removable contact members to open or close an electrical circuit. Support means for the switch operator are adjustably coupled through an end wall of the housing for adjusting the switch operator longitudinally in the open ended guide tube to preset the level of acceleration actuating the movable contact members. Locking means are provided for the switch operator support means to prevent movement after the level of acceleration has been preset.

An object of the present invention is the provision of acceleration responsive inertia masses producing a magnetic field varying in intensity with acceleration.

Another object is to provide acceleration responsive inertia masses producing a magnetic field varying in intensity with acceleration actuating circuit means in response to a predetermined magnetic field intensity.

A further object of the invention is the provision of acceleration responsive inertia masses producing a magnetic field of varying intensity with acceleration, controlling the variation in intensity of the magnetic field with acceleration for actuation of circuit means in response to a predetermined field intensity.

Still another object of the invention is to provide fluid dampening for acceleration switches in which movable contacts are free from dampening fluids.

Another object of the present invention is the provision of a magnet inertia mass which is fluid damped and varies a magnetic field around circuit means responsive thereto.

Other objects and features of the invention will become apparent to those skilled in the art as the disclosure is made in the following detailed description of a preferred embodiment of the invention as illustrated in the accompanying sheets of drawing in which.

Figure 1:
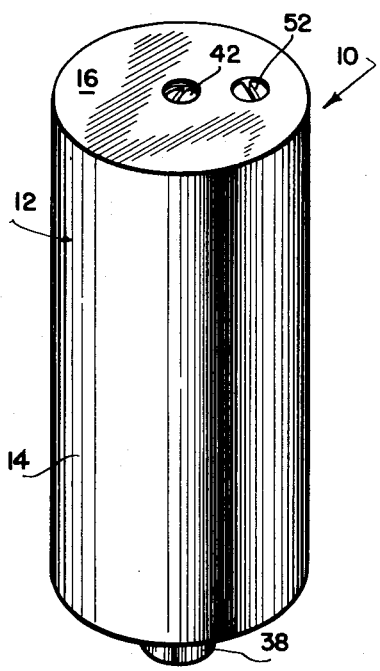
Figure 1 is a perspective view of a preferred embodiment of the invention.

Referring now to the drawings wherein like reference characters designate like or corresponding parts throughout the several views, there is shown in Figure 1 which illustrates the preferred embodiment, an acceleration switch 10 including a body or housing 12 having a cylindrical side wall 14 and end walls 16 and 18 for housing a switch operating mechanism and electrical circuit means actuated by the switch operating mechanism.

Figure 2:
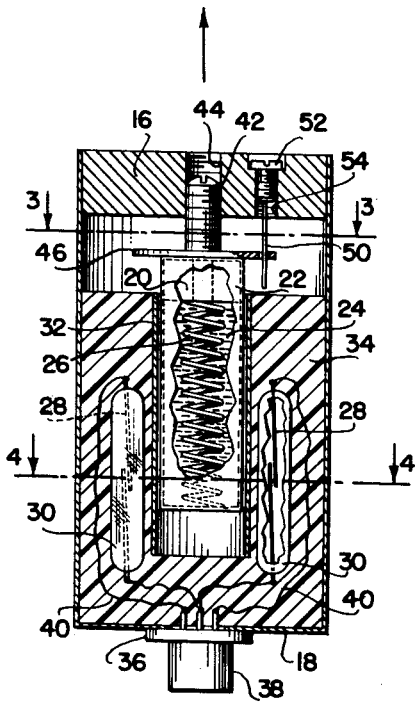
Figure 2 is a vertical cross-sectional view of the device shown in Figure 1.
Figure 3:
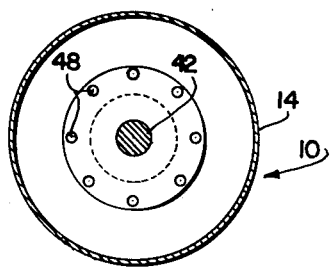
Figure 3 is a horizontal cross-sectional view taken along the line 3—3 of Figure 2 showing the portion viewed looking in a direction of the arrows.
Figure 4:
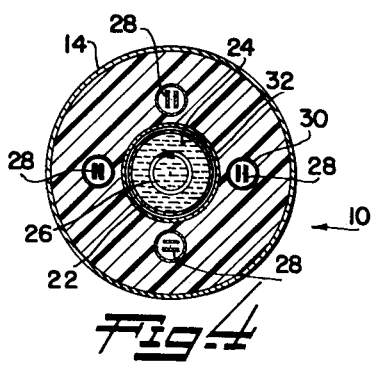
Figure 4 is a horizontal cross-sectional view of the device taken along line 4—4 of Figure 2.

Referring to Figures 2 and 4 for detailed description of the magnetic switch operator, a reciprocating magnet 20 having a central opening 21 is shown providing an inertia mass movable in response to the forces of acceleration to produce a magnetic field of varying intensity at points along the path of movement of the magnet. A sealed tube 22 provides an elongated enclosure to guide the magnet along a predetermined path for unidirectional sensitivity. The tube contains a viscous damping fluid 24 for dampening the movement of the magnet 20 in response to forces of acceleration delaying the response of the magnet to acceleration whereby accelerations of a preset level must be of predetermined time duration in order to operate the switch or actuate the movable contact members to open or close electrical circuits (not shown). The time delay or damping is determined by the size of the opening 21 and the viscosity of the damping fluid 24 such as silicone oil. Also included in the sealed tube enclosure 22 is the helical spring 26 positioned longitudinally in the tube and seated in one end thereof. The other end of the spring presses against the magnet for biasing it to the other end of the tube 22.

The mass of the magnet and the size of the spring are chosen so that pre-stressed magnetic reed movable contact members 28 are actuated in response to the magnetic field of the magnet at a preset level of acceleration. The movable contact elements 28 are enclosed in sealed envelopes 30 which are supported alongside the operator and longitudinally in the switch body 12 adjacent an open ended guide tube 32. The likelihood of contact closures due to vibration or shock, may be reduced or eliminated by connecting sets of magnetic reeds in series wherein at least one set is mounted such that the movement of the reeds is at right angles to other set(s), connected in series therewith. In the drawing, this has been illustrated by the sets of reeds positioned at right angles with respect to one another.

The concentric guide tube 32 provides for longitudinal positioning of the switch operator and magnet 20 relative to the movable contact members 28. The open ended guide tube for the operator is rigidly supported in a position along the length of the switch body 12 by hardenable material or potting compound 34 which has set. The sealed envelopes 30 for the movable contact members 28 are also set in the potting compound 34 to maintain the magnetic field responsive reed contact members in position relative to the switch operator. The movable contact members or carriers 28 are individually connected to electrical terminals 36 of a suitable electrical connector 38 by leads 40 whereby the movable contact elements 28 can be coupled into external electrical circuitry.

In the preferred arrangement, the mass of the magnet and the size or resiliency of the helical spring 26 primarily control the closing of the movable contact members 28 at a preset level of acceleration. The actuation of the contact or circuit members by the switch operator is regulated by a switch operator support means secured to the tube 22 and adjustably coupled through the end wall 16 by the set screw 42 threaded in a central opening 44 in the wall.

The adjustable support means further includes means for locking in the adjustment to the preset level of acceleration. The locking means include an end indexing plate 46 having openings 48 about the periphery for receiving a locking pin 50 projecting longitudinally through the end wall 16 and secured to the lower end of a tap screw 52 which is threaded in an opening 54 in the end wall 16.

In operation, acceleration of the switch in Figure 2 along its axis in the direction indicated causes the inertia of the suspended magnet 20 to compress the spring 26 and the magnet travels down the guide tube 22. The movement of the magnet against the spring is delayed or dampened by the passage of the fluid 24 past the magnet whereby the acceleration must be of a predetermined time duration in order for the magnet to travel down the tube 22 and set up a magnetic field of a predetermined intensity which is capable of actuating the movable contact members 28 in the envelopes 30. Actuation of the movable contact members 28 to closed position completes external electrical circuits connected to the respective members through the connector 38.

Figure 5:
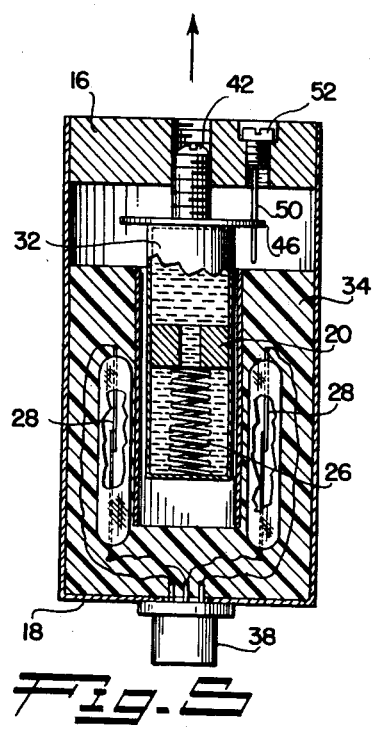
Figure 5 is a vertical cross-sectional view of the preferred embodiment of Figures 1 and 2 in actuated condition.
Figure 7:
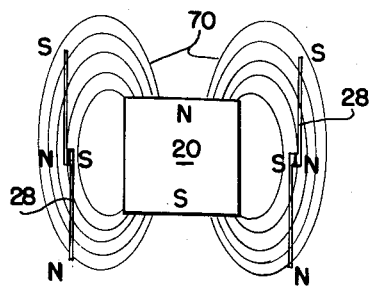
Figure 7 is a diagrammatic view of certain parts of the invention for clarifying its operation.

In Figure 5, the preferred embodiment has been shown in actuated condition wherein the preset level of acceleration in the direction indicated has been reached for the minimum time duration moving the magnet down the guide tube 22 to increase the magnetic field intensity actuating the contact members 28. The actuation of the movable contact reeds 28 by the magnet 20 is illustrated in Figure 7 where the magnetic field or flux 70 produced by the magnet in the area of the reeds 28 has reached a predetermined level causing the reeds to close at their opposing contact areas. The magnetic field traversing the reeds causes the individual reeds to acquire the characteristics and properties of a magnet, i.e. form individual magnets of the reeds having the polarities shown. Since opposite poles attract, the opposing ends or contact areas close when the intensity of the magnetic field 70 is sufficiently dense or strong to overcome the resilience of the reeds. It will be apparent from the foregoing description that the magnetic field intensity and the control thereof in the area of the reeds 28 determines the actuation. Therefore, the magnet 20 need not reach the central area between the reeds as indicated in Figure 7 in order to actuate them but need only approach the position illustrated in many instances. The factors determining operation are: weight of the magnet, resiliency of the spring and field strength of the magnet. Also the adjustment of the switch operator controls the preset level of acceleration.

In the adjustment of the switch operator support means in Figure 2, movement of the switch operator mechanism downwardly as shown in the drawings tends to lower the preset level of acceleration actuating the movable contact members 28 whereas movement of the switch operator upwardly tends to raise the preset level of acceleration necessary to actuate the movable contact members 28. Whenever it is desired to adjust the level of acceleration, the set screw 52 is turned to withdraw the locking pin 50 from the opening in the indexing plate 46. The locking pin must be withdrawn the distance necessary to permit freedom of movement of the indexing plate for its travel during adjustment. After the support means has been unlocked by removal of the locking pin 50 the operating mechanism is free to rotate, moving the set screw 42 longitudinally in the threaded opening adjusting the longitudinal position of the switch operator and the level of acceleration.

Figure 6:
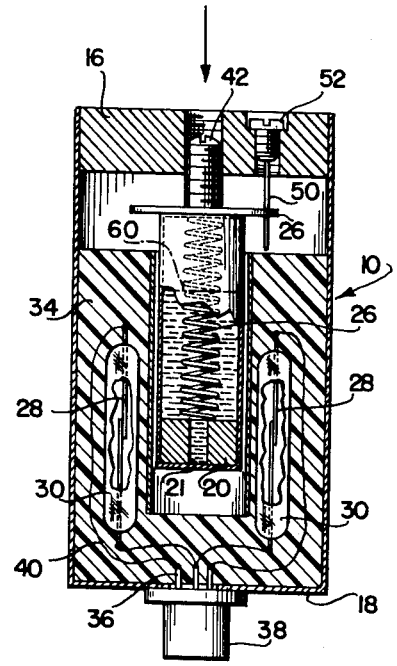
Figure 6 is a vertical cross-sectional view of an alternate embodiment of the invention.

An alternate embodiment of the acceleration switch has been shown in Figure 6 in which the magnetic switch operating mechanism has been reversed to provide an acceleration switch having normally closed contacts. Other than the switch operating mechanism the acceleration switch shown in Figure 6 is identical in construction to the acceleration switch of the preferred embodiment. As shown by the drawings, the reversal of the switch operator positions the magnet 20 between the contact members 28. The magnetic field of the magnet traverses the reeds and due to its proximity produces a magnetic field of sufficient strength to actuate the reeds to their closed position.

In the operation of the alternate embodiment of Figure 6, acceleration of the switch 10 to a preset level for a minimum time period causes the inertia of the mass of the magnet 20 to compress the helical spring 26. During the minimum time period, the movement of the magnet against the bias of the spring is dampened by the restricted flow of the damping fluid past the magnet through the passage or opening 21 therein. After the minimum time period has elapsed and after the preset level of acceleration has been reached for the minimum time period, the magnet 20 will have traveled along the tube against the bias of the spring 26 to a position e.g. the position 60 indicated in the dotted lines in Figure 6 where the magnetic field from the magnet which is traversing the reeds 28 is insufficient to maintain the reeds in their closed position.

The reeds or movable contacts will remain open until the acceleration of the switch 10 falls below the preset level where the bias of the spring will overcome or be larger than the force produced on the magnet by the acceleration and the magnet will move back to its normal at rest or spring biased position indicated in solid lines. During the magnet's return travel, the intensity of the magnetic field will increase in the area of the reeds to close them by increasing the magnetic force between the opposing contact areas to overcome the resilient bias of the reeds tending to maintain them open.

Thus an acceleration switch has been provided having normally closed contacts. It will be observed from the foregoing that a combination of normally closed and normally opened switches may be arranged or positioned above and below one another alongside the switch operator. It is also contemplated that movable contact members located laterally adjacent the contact members 28 would be actuated at different levels of acceleration due to the proportional decrease in field strength with distance. Another arrangement for sequential operation would be provided by reed members having different bias. Further, the actuation of the contact members 28 can be controlled by the lateral spacing of the contact members from the switch operator. In the latter arrangements, sequential operation as well as actuation at different preset levels of acceleration of the contact members is provided.

Preferably, the switch body 12 is hermetically sealed and all materials used are non-magnetic to prevent shielding or absorption of the magnetic field produced by the magnet 20. Magnetic shielding or absorption by magnetic material will prevent full effective use of the field strength for the magnet 20 in the actuation of the movable contact members 28.

In some instances, however, it may be desirable to utilize magnetic absorption or shielding and such is contemplated wherein a predetermined magnetic field may be set up in the switch body and its density varied in the area of the contact members by an inertia mass of magnetic material replacing the magnet 20. As in the operation with the magnet the movement of the inertia mass magnetic material can vary the magnetic field traversing the movable contact elements sufficiently to actuate them.

While certain preferred embodiments of the invention have been specifically disclosed, it is understood that the invention is not limited thereto as many variations will be readily apparent to those skilled in the art and the invention is to be given as broad as possible interpretation within the terms of the following claims.

I claim:

1. An acceleration switch comprising; operator means for producing a variable magnetic field intensity including a movable mass of magnetic material responsive to acceleration forces, a sealed fluid filled elongated tube enclosure about said mass for dampening and guiding its movement and means normally biasing said mass to one end of said tube enclosure, and enclosed switching means adjacent said tube enclosure and path of movement of the movable mass, actuated in response to movement of the mass along the path.

2. An acceleration switch comprising; means including an inertia mass of magnetic material responsive to acceleration forces to produce a variable intensity magnetic field and a sealed fluid filled enclosure about said mass for dampening its movement, enclosed electrical contact members disposed in operative alignment adjacent said enclosure and path of movement of the inertia mass, actuated in response to a predetermined magnetic field intensity, and means normally restraining said mass toward one end of said enclosure.

3. A magnetic acceleration switch comprising an elongated switch housing having side and end walls, a magnetic switch operator including a movable magnet providing an inertia mass, a sealed tube enclosure for guiding the magnet for unidirectional sensitivity, viscous damping fluid in the enclosure and a helical spring placed longitudinally in the sealed tube biasing the magnet to one end of the enclosure, an open ended guide tube for the sealed tube enclosure supported centrally in and along the length of the elongated housing, movable contact members responsive to the magnetic field of the magnet enclosed in a sealed envelope supported adjacent the open ended guide tube, support means for the switch operator adjustable coupled through an end wall of the housing including means for locking the support means in position in the end wall to preset the level of acceleration actuating the contact member.

4. A magnetic acceleration switch comprising an elongated switch housing having side and end walls, a magnetic switch operator including a reciprocating magnet providing an inertia mass, a sealed tube enclosure for guiding the magnet for unidirectional sensitivity, viscous damping fluid in the enclosure, and a helical spring placed longitudinally in the sealed tube biasing the magnet to one end of the enclosure, an open ended guide tube surrounding the sealed tube enclosure and supported centrally in and along the length of the elongated housing, a pair of normally open contact carriers maintained in operative alignment closed in response to the magnetic field of the magnet, said carriers being enclosed in a sealed envelope supported adjacent the end of the sealed tube enclosure remote from the magnet, support means coupled to the switch operator and adjustable coupled through an end wall of the housing including means for locking the support means in position in the end wall to preset the level of acceleration actuating the contact carriers.

5. A magnetic acceleration switch comprising an elongated switch housing having side and end walls, a magnetic switch operator including a movable magnet providing an inertia mass, a sealed tube enclosure for guiding the magnet for unidirectional sensitivity, viscous damping fluid in the enclosure, and a helical spring placed longitudinally in the sealed tube biasing the magnet to one end of the enclosure, an open ended guide tube supported centrally in and along the length of the elongated housing, a pair of normally closed contact members maintained in operative alignment opened in response to a decrease in magnetic field, said member being enclosed in a sealed envelope supported adjacent the end of the sealed tube enclosure containing the magnet in biased position, support means rigidly coupled to the switch operator and adjustable coupled through an end wall of the housing including means for locking the support means in position in the end wall to preset the level of acceleration actuating the contact members.

6. An acceleration switch comprising, operator means for producing a variable magnetic field intensity including a movable mass of magnetic material responsive to acceleration forces and a sealed fluid filled enclosure about said mass for dampening and guiding its movement, enclosed switching means adjacent said enclosure and path of movement of the movable mass, actuated in response to movement of the mass along the path, and support means securing said enclosure and movable mass in any one of a plurality of positions relative to said switching means to preset the level of acceleration actuating said switching means.

References Cited in the file of this patent

UNITED STATES PATENTS

| | | |
|---|---|---|
| 2,622,163 | Snell | Dec. 16, 1952 |
| 2,671,834 | Kmiecik | Mar. 9, 1954 |
| 2,791,653 | Haberland | May 7, 1957 |
| 2,791,657 | Bloxsom et al. | May 7, 1957 |
| 2,850,590 | Marks et al. | Sept. 2, 1958 |